No. 759,711. PATENTED MAY 10, 1904.
F. C. HEIM.
SMOKE CONSUMER.
APPLICATION FILED MAY 19, 1903.
NO MODEL.
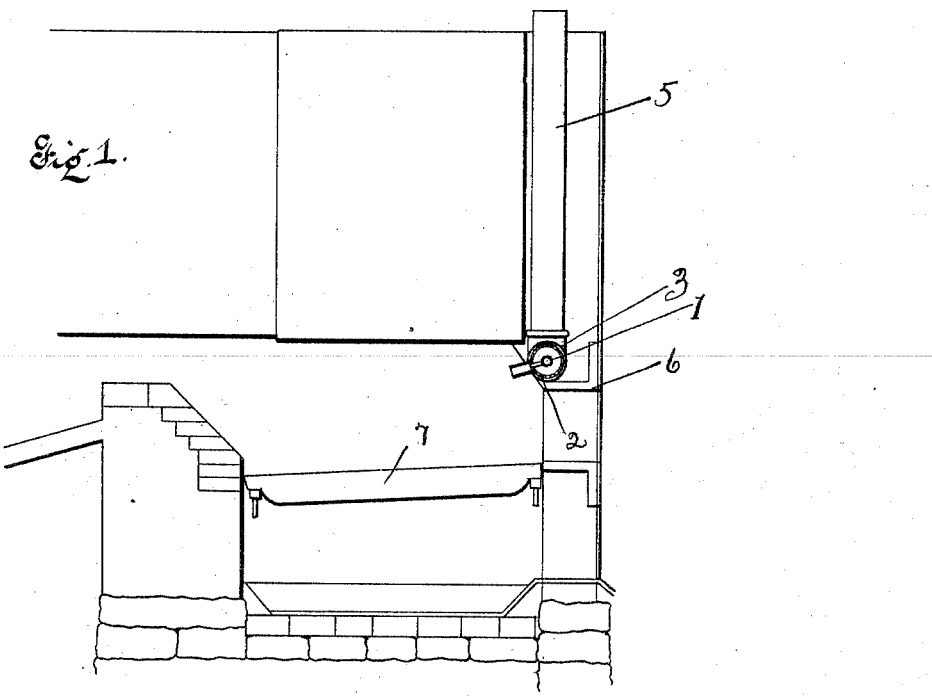
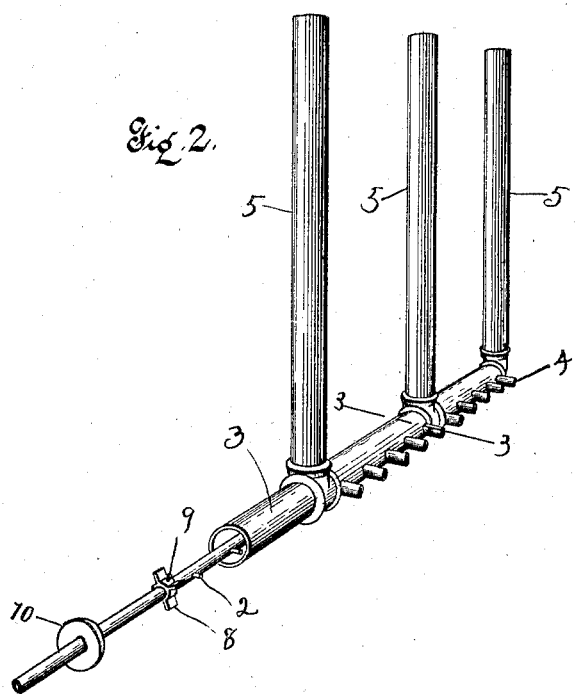
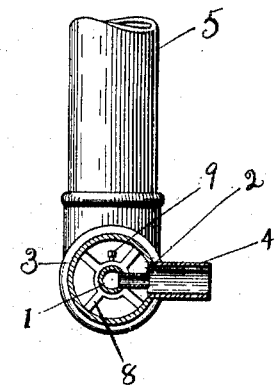
Inventor
FRANK C. HEIM No. 759,711.

Patented May 10, 1904.

UNITED STATES PATENT OFFICE.

FRANK C. HEIM, OF ST. LOUIS, MISSOURI.

SMOKE-CONSUMER.

SPECIFICATION forming part of Letters Patent No. 759,711, dated May 10, 1904.

Application filed May 19, 1903. Serial No. 157,796. (No model.)

*To all whom it may concern:*

Be it known that I, FRANK C. HEIM, a citizen of the United States, residing at St. Louis, State of Missouri, have invented certain new and useful Improvements in Smoke-Consumers, of which the following is a specification containing a full, clear, and exact description, reference being had to the accompanying drawings, forming a part hereof.

My invention relates to improvements in smoke-consumers; and it consists in the novel subject-matter hereinafter described and claimed.

The object of my invention is to provide an improved smoke-consumer of the steam-jet type which shall be simple in construction and efficient and economical in operation.

In the drawings, Figure 1 is a sectional elevation of a portion of a boiler-furnace having my invention applied thereto. Fig. 2 is a detail view in perspective of the device detached. Fig. 3 is a detail sectional view taken through the device on the line 3 3 of Fig. 2.

1 indicates a horizontal jet-pipe which is provided at intervals of its length with a series of steam-discharging nozzles 2, which all project in the same direction, so that a series of steam-jets will be discharged from said jet-pipe when the latter is connected to a suitable steam-supply pipe. (Not shown.) The said jet-pipe is placed centrally within a larger air-pipe 3, which is provided with a series of mixing-tubes 4, all projecting in the same direction. Connecting with the said air-pipe at intervals of its length is a series of vertical air-pipes 5, the lower ends of which are connected to said air-pipe 3 and the upper ends of which air-pipes 5 project a distance beyond the top of the furnace, so that a supply of fresh air may be drawn into said pipes 5 during operation. The air-pipe 3 and also the air-pipes 5 are preferably subjected to the action of the fire, and thereby heated during operation. I preferably locate the said air-pipe 3 horizontally in the front of the furnace just above the fire-door 6, so that the mixing-tubes will discharge their contents rearwardly and downwardly toward the inner ends of the grate-bars 7. The air-pipe 3 is preferably made in sections, as shown, and jointed together, so that said sections may be separated when desired for the purpose of cleaning or repairing the same.

The jet-pipe 1 is held centrally within the air-pipe 3 by means of four armed brackets 8, any number of which may be used upon said jet-pipe. Said brackets are provided with a set-screw 9, whereby the same may be fixed upon said jet-pipe. The jet-pipe is adjusted within the air-pipe 3, so that the nozzles 2 will discharge each through its appropriate mixing-tube 4, as shown in the drawings, and the outer end of said jet-pipe should be connected to a common steam-supply pipe and controlled by a common valve. (Not shown.)

In Fig. 2 I have shown the jet-pipe partially withdrawn from the air-pipe 3; but in practice the same should be located within said air-pipe, so that all of the nozzles 2 will discharge into a mixing-tube. One end of the air-pipe 3 preferably projects upon the exterior of the furnace-wall and is temporarily closed by a suitable cap or cover 10 in order to prevent the air from entering the said end of the air-pipe.

In operation when steam is supplied to the jet-pipe jets of steam will be discharged through each of said nozzles and into each of said mixing-tubes, and air will thereby be drawn into said mixing-tubes from the air-pipe 3 and will be forced into the fire, with the usual result that the smoke will be more or less consumed. The air enters the vertical pipes 5 and is therein partially heated and passes into the horizontal air-pipe 3, where it is still further heated before being discharged through the mixing-tubes.

It will be seen that the steam-nozzles 2 are very short, so that the jet-pipe 1, carrying all of the said nozzles, may be readily inserted within and withdrawn from the horizontal air-pipe 3. It will be further observed that one end of said air-pipe 3 projects exterior of the furnace-wall and is temporarily closed by the removable cover 10, which latter is carried upon the jet-pipe 1 and is removable therewith. The advantage of such construction is that the engineer or fireman can at any time during operation slide back the cover 10 upon said jet-pipe 1 and then have an accurate view of all the steam-jets upon the interior of the air-pipe 3 and can readily determine whether or not all of them are working properly. If any jet should fail to work, the suction created by the other jet on the interior of said air-pipe 3 would cause flame and smoke to enter the mixing-tube 4 of the disabled jet, and such flame would have a deteriorating effect upon the jets and would probably soon burn them out and render the entire device inoperative. Hence the desirability of providing means upon the exterior of the furnace whereby the engineer or fireman may conveniently inspect all of the jets during operation. Another advantage of having the air-pipe 3 open upon the exterior of the furnace is that such construction permits the entire jet-pipe 1, carrying all of the jets, to be quickly removed from the air-pipe 3 while the furnace is in operation, and upon the removal of the jets repairs may be quickly made and the jet-pipe again inserted without shutting down the furnace.

I claim—

An improved steam-jet smoke-consumer, comprising the combination with a furnace, of a horizontal air-pipe, one end of which projects free on the exterior of the furnace-wall, a removable cover for said projecting end of said air-pipe, a steam-pipe having a series of nozzles and detachably mounted within said air-pipe but bodily removable therefrom while said nozzles are intact, said steam-pipe extending through a central opening in said cover, and means for supplying air to the said air-pipe, substantially as specified.

In testimony whereof I have signed my name to this specification in presence of two subscribing witnesses.

FRANK C. HEIM.

Witnesses:
ALFRED A. EICKS,
JOHN C. HIGDON.